United States Patent
Dao et al.

(10) Patent No.: US 10,878,406 B2
(45) Date of Patent: Dec. 29, 2020

(54) SYSTEMS AND METHODS FOR TOKEN AND TRANSACTION MANAGEMENT

(71) Applicant: JPMorgan Chase Bank, N.A., New York, NY (US)

(72) Inventors: Tuan Dao, Richardson, TX (US); Howard Spector, Woolwich, NJ (US); Raghuram Vudathu, Downingtown, PA (US); Yunchul Bryan Jeon, Plano, TX (US); Rajitha Dissanayake, Frisco, TX (US); Sunil Mathur, Hockessin, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/220,924

(22) Filed: Dec. 14, 2018

(65) Prior Publication Data
US 2020/0193417 A1    Jun. 18, 2020

(51) Int. Cl.
G06Q 20/36    (2012.01)
G06Q 20/08    (2012.01)

(52) U.S. Cl.
CPC ......... *G06Q 20/36* (2013.01); *G06Q 20/0855* (2013.01)

(58) Field of Classification Search
CPC ............................ G06Q 20/36; G06Q 20/0855
USPC ........................................................ 705/41
See application file for complete search history.

(56) References Cited

U.S. PATENT DOCUMENTS

| | | | |
|---|---|---|---|
| 9,721,268 B2* | 8/2017 | Bondesen et al. | G06Q 30/0215 |
| 2014/0089261 A1* | 3/2014 | Aissi et al. | G06F 17/30575 707/621 |
| 2016/0019536 A1* | 1/2016 | Ortiz et al. | G06Q 20/38 |
| 2016/0364721 A1* | 12/2016 | Deliwala et al. | G06Q 20/36 |
| 2017/0061427 A1* | 3/2017 | Sharma et al. | G06Q 20/367 |
| 2017/0068952 A1* | 5/2017 | Brocknnann et al. | G06Q 20/363 |
| 2017/0200160 A1* | 7/2017 | Kumar et al. | G06Q 20/405 |
| 2018/0101857 A1* | 4/2018 | Deliwala et al. | G06Q 30/0226 |
| 2019/0279221 A1* | 9/2019 | Wang et al. | G06Q 20/40975 |

OTHER PUBLICATIONS

US Payments Forum, Mobile and Digital Wallets: U.S. Landscape and Strategic Considerations for Merchants and Financial Institutions, Jan. 2018, Version 1.0, pp. 1-50. (Year: 2018).*
U.S. Appl. No. 16/010,677, filed Jun. 2018, Dao et al.

* cited by examiner

*Primary Examiner* — Elizabeth H Rosen
*Assistant Examiner* — George N. Proios
(74) *Attorney, Agent, or Firm* — Greenberg Traurig LLP

(57) ABSTRACT

Systems and methods for token and transaction management are disclosed. According to one embodiment, in an issuer wallet server comprising at least one computer processor, a method for token and transaction management may include: (1) receiving a update for an attribute for a Device WalletID or an issuer wallet application executed by an electronic device; (2) providing the update to the issuer wallet application; (3) providing the update to a third party wallet server associated with a third party wallet application executed by the electronic device, wherein the third party wallet server communicates the update to the third party wallet application; and (4) updating the attribute in the Device WalletID.

20 Claims, 3 Drawing Sheets

US 10,878,406 B2

SYSTEMS AND METHODS FOR TOKEN AND TRANSACTION MANAGEMENT

BACKGROUND OF THE INVENTION

1. Field of the Invention

The present disclosure generally relates to systems and methods for token and transaction management.

2. Description of the Related Art

In order for an issuer's digital wallet and a third party's digital wallet to co-exist and collaborate, a mechanism must be provided for the two wallets to inform each other of the state of their tokens. Because the user may uninstall or manually make changes to one of the digital wallets but not the other, an additional mechanism is required to synchronize the issuer's server and the third party's server. This server-to-server mechanism is also required to facilitate any transaction management outside of the payment industry standards.

SUMMARY OF THE INVENTION

Systems and methods for token and transaction management are disclosed. According to one embodiment, in an issuer wallet server comprising at least one computer processor, a method for token and transaction management may include: (1) receiving a update for an attribute for a Device WalletID or an issuer wallet application executed by an electronic device; (2) providing the update to the issuer wallet application; (3) providing the update to a third party wallet server associated with a third party wallet application executed by the electronic device, wherein the third party wallet server communicates the update to the third party wallet application; and (4) updating the attribute in the Device WalletID.

In one embodiment, the attribute may specify a suppression state for a feature of the issuer wallet application or the third party wallet application. The suppression state may specify suppression of NFC communication.

In one embodiment, the attribute may include a partner attribute, a device-level wallet attribute, or a token level attribute. The partner attribute may identify the third party wallet application. The device-level wallet attribute may identify a wallet binding state. The device-level wallet attribute may specify a user preference for a feature of the issuer wallet application or the third party wallet application. The user preference may include a show preference for the feature. The token level attribute may include a token wallet characteristic that identifies a linkage between the issuer wallet application and the third party wallet application.

In one embodiment, the update may be received from an issuer backend, the issuer wallet application, etc.

In one embodiment, the issuer wallet server may push the update to the issuer wallet application.

In one embodiment, the issuer wallet server may provide the update to the third party wallet server using an API.

In one embodiment, the issuer wallet application may communicate the update to the third party wallet application using application-to-application communication.

According to another embodiment, a system for token and transaction management may include an issuer wallet application executed by an electronic device, and an issuer wallet server comprising at least one computer processor, wherein the issuer wallet server stores a Device WalletID for the issuer wallet, the Device WalletID comprising a plurality of attributes. The issuer wallet server may receive an update for one of the attributes in the Device WalletID, may provide the update to the issuer wallet application, ma provide the update to a third party wallet server associated with a third party wallet application executed by the electronic device, wherein the third party wallet server communicates the update to the third party wallet application, and may update the attribute in the Device WalletID.

In one embodiment, the attribute may specify a suppression state for a feature of the issuer wallet application or the third party wallet application. The attribute may include a partner attribute, a device-level wallet attribute, or a token level attribute. The device-level wallet attribute may identify a wallet binding state. The token level attribute may include a token wallet characteristic that identifies a linkage between the issuer wallet application and the third party wallet application.

In one embodiment, the issuer wallet server may provide the update to the third party wallet server using an API.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems and methods for mobile wallet payments.

In embodiments, a four-way communication system is provided in which an issuer wallet server acts as a global system of records orchestrating communication and synchronization among the issuer digital wallet application, a third party digital wallet application, and a third party wallet server. In one embodiment, the issuer wallet server may maintain the states of all tokens in the third party wallet application as well as their linkage to the third party wallet application.

In one embodiment, a Token Wallet Characteristic (TWC) and/or a Token Transaction Characteristic (TTC) may be used. Examples of the use of the TWC and TTC are disclosed, for example, in U.S. patent application Ser. No. 16/010,677 and U.S. Provisional Patent Application Ser. No. 62/778,977, the disclosures of which are hereby incorporated, by reference, in their entireties.

In one embodiment, the issuer wallet application may communicate with the third party wallet application locally on the electronic device. The issuer wallet application may synchronize with the issuer wallet server, and the third party wallet application may synchronize with the third party wallet server. The issuer wallet server may communicate with the third party wallet server to both synchronize the token and wallet states, and to perform non-standard payment functions.

Figure 1:
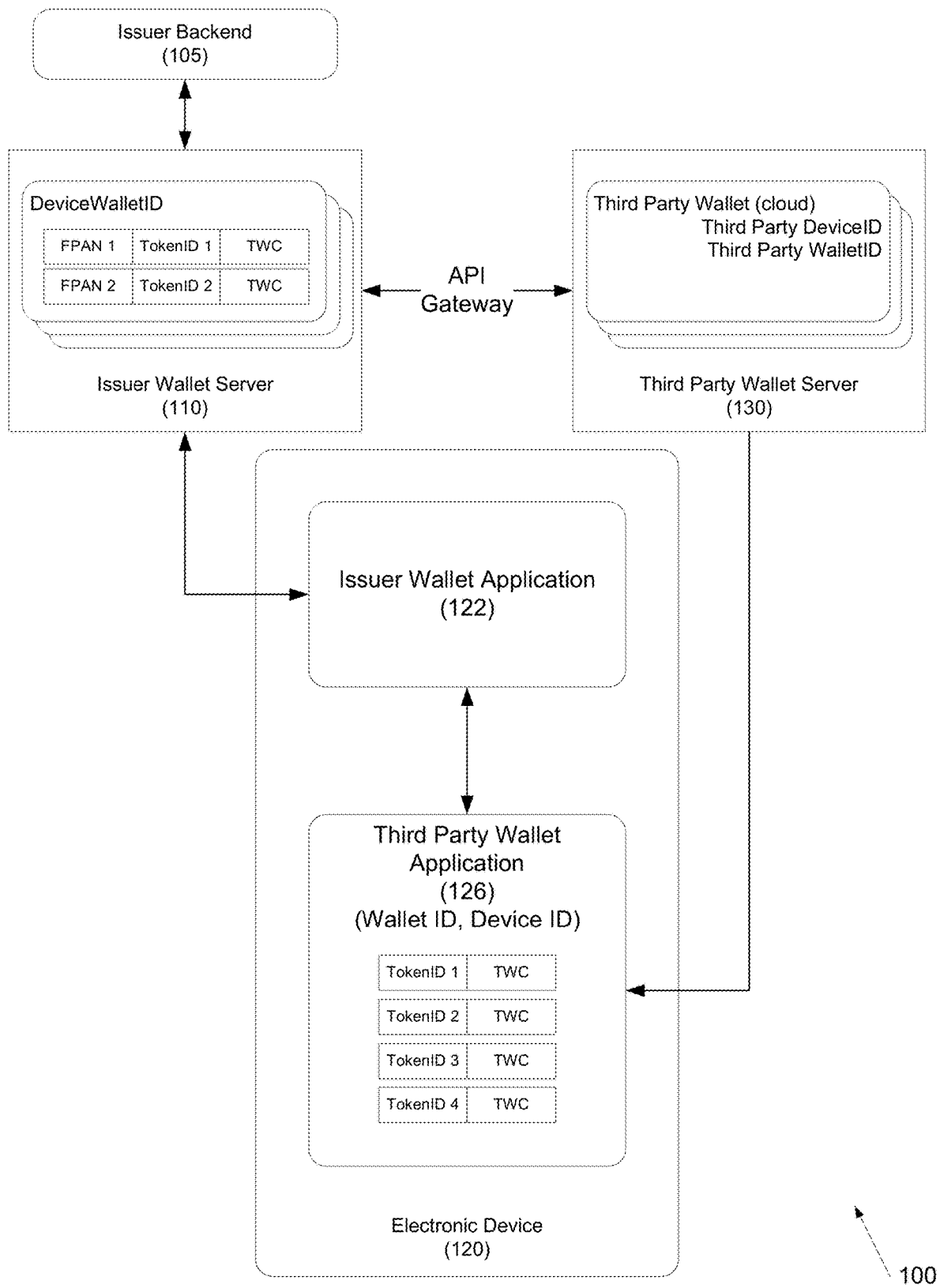
FIG. 1 depicts a system for token and transaction management according to one embodiment.

Referring to FIG. 1, a system for token and transaction management is disclosed according to one embodiment. System 100 may include issuer backend 105, issuer wallet server 110, mobile device 120, and third party wallet server 130. In one embodiment, issuer wallet server 110 may be considered to be the system of record for all wallet-binding and token-linkage states when integrated with any third party wallets. For example, issuer wallet server 110 may maintain the state of connection, or "binding," of the issuer wallet application to the third party wallet application, and the state of the third party token in the third party wallet application that is linked to the issuer wallet.

Issuer wallet server 110 may include one or more user profiles for each wallet stored on each device. For example, a user profile may include an issuer WalletID, which may include tokens (e.g., having a digital PAN, token wallet characteristic (TWC), etc.). Each issuer Wallet ID may include a device-bound wallet container, such as a DeviceWalletID, which may be an identifier for a particular user's issuer wallet application on the device. The DeviceWalletID may specify, for example, partner attributes (e.g., a third party wallet ID), device wallet-level attributes (e.g., a DeviceWalletID, user preferences, (e.g., show preferences, default preferences, etc.) and token-level attributes (e.g., Token Wallet Characteristic, or TWC, that may identify a linkage between the issuer wallet application and the third party wallet application). It may further identify whether the profile is bound or unbound to a third party wallet.

Issuer backend 105 may provide issuer wallet server with wallet information, such as suppression states, user preferences, etc. Examples may include NFC suppression, pay-with-points (or an alternate currency) suppression, etc. In one embodiment, issuer backend 105 may store/manage general control states, or user account level states outside of those specific to wallet-related states. In one embodiment, the information may be pushed from issuer backend 105 to issuer wallet server 110. In another embodiment, issuer wallet server 110 may pull the information from issuer backend 105.

Third party wallet server 130 may store and/or manage a particular wallet and its tokens on a device, such as the DeviceID, WalletID, third party userID, tokens, and any other suitable token-related characteristics, such as linkage, as specified by the issuer.

Figure 2:
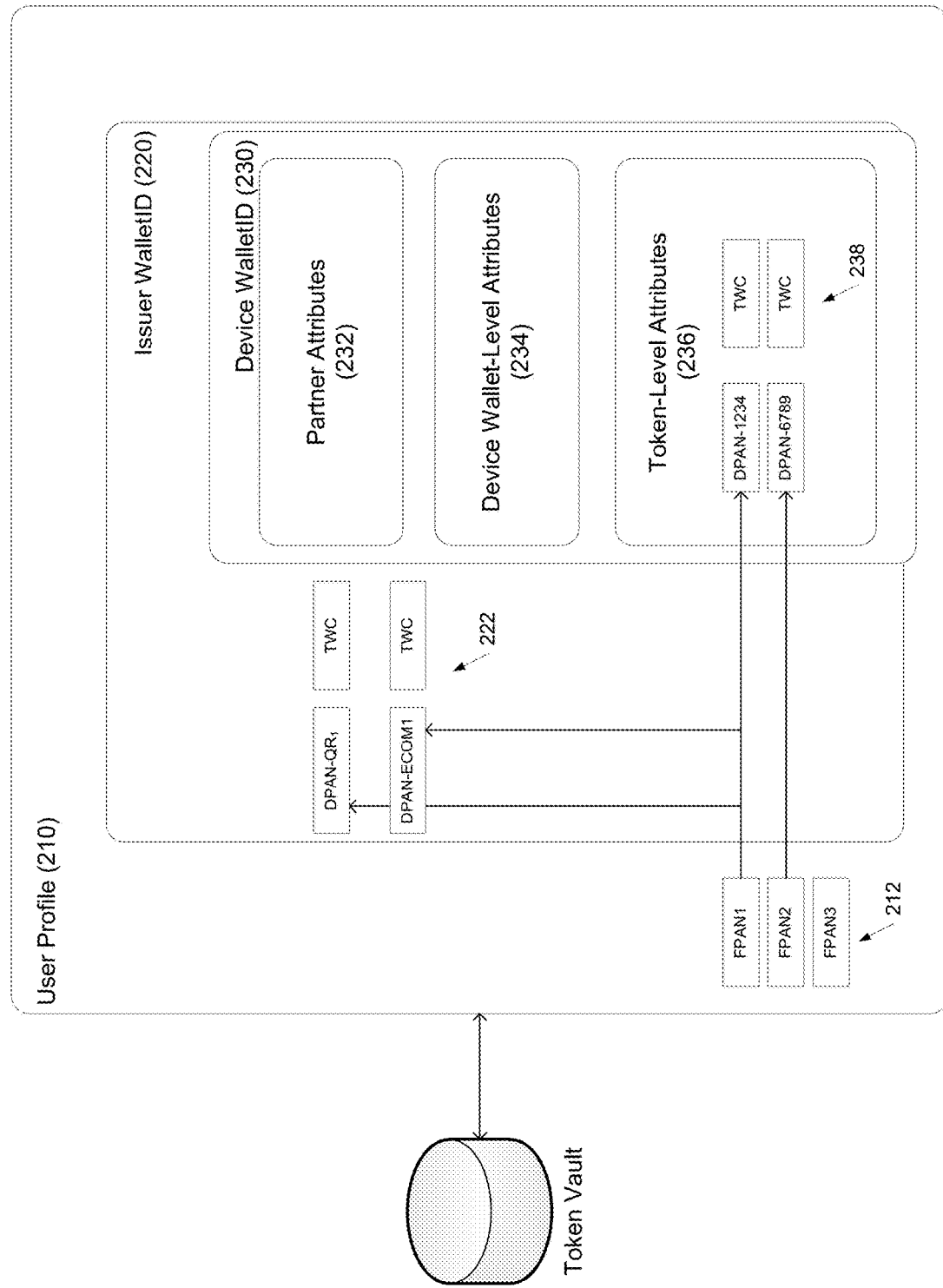
FIG. 2 depicts a method for token and transaction management according to one embodiment.

An exemplary user profile is provided in FIG. 2. For example, user profile 210 may include accounts 212, such as FPAN 1, FPAN2, FPAN 3, etc. Each user profile 210 may include Issuer WalletID 220, which may include tokens 222 (e.g., having a digital PAN (DPAN), a token wallet characteristic (TWC), etc.). In one embodiment, the tokens may be cloud-based tokens. Each Issuer Wallet ID 220 may include a device-bound wallet container, such as a DeviceWalletID 230, which may be an identifier for a particular user's issuer wallet application on the device). DeviceWalletID 230 may specify, for example, partner attributes 232 (e.g., a third party wallet ID), device wallet-level attributes 234 (e.g., a DeviceWalletID, user preferences 236 (e.g., show preferences, default preferences, etc.) and token-level attributes for tokens 238 (e.g., Token Wallet Characteristic, or TWC, that may identify a linkage between the issuer wallet application and the third party wallet application). It may further identify whether the profile is bound or unbound to a third party wallet.

Referring again to FIG. 1, electronic device 120 may be any suitable electronic device, including, for example, smart phones, smart watches, smart vehicles, desktop computers, notebook computers, laptop computers, tablet computers, Internet of Things (IoT) appliances, etc. In one embodiment, electronic device 120 may execute issuer wallet application 122 and third party wallet application 126.

Issuer wallet application 122 may communicate with issuer wallet server 110 and may download wallet, token, and/or suppression states from issuer wallet server 110. Issuer wallet application 122 may further provide updates to issuer wallet server 110, such as updates in binding and/or linkage events, updates in user preferences, and any local wallet and user setting states which the issuer wallet application wants to relay back to issuer backend 105 for persistent storage.

Third party wallet application 126 may store one or more token identifiers (e.g., TokenID 1, TokenID 2, etc.) along with a linkage to issuer wallet application 122. For example, on the issuer side, the TWC may identify the linkage state among other characteristics that the issuer may track.

Third party application 126 may receive information from third party wallet server 130. In one embodiment, this may be via a device manager server (not shown).

Issuer wallet application 122 and third party wallet application 126 may communicate, for example, by application-to-application communication.

Issuer wallet server 110 and third party wallet server 130 may communicate, for example, using an API gateway, direct calls to the server, etc.

Figure 3:
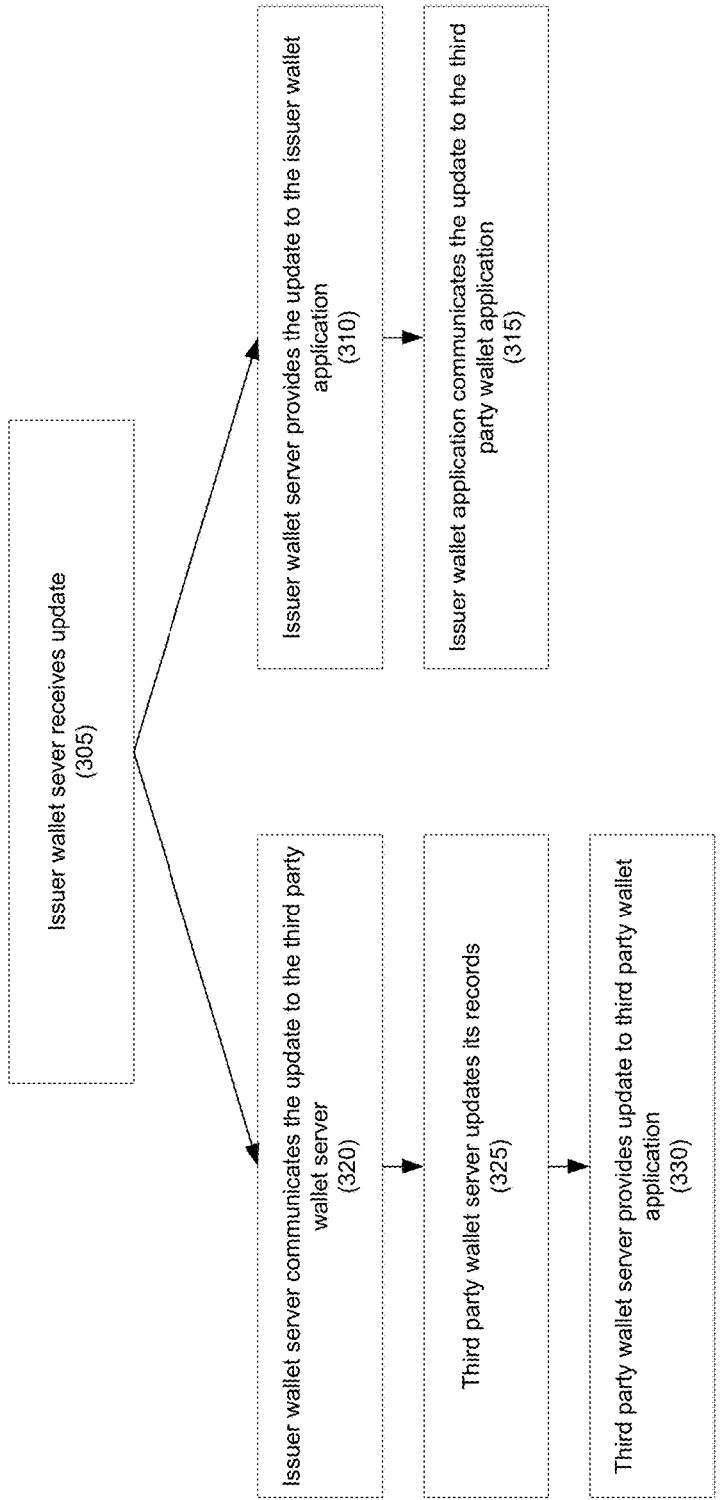
FIG. 3 depicts a method for token and transaction management according to one embodiment.

Referring to FIG. 3, a method for token and transaction management is disclosed according to one embodiment.

In step 305, an issuer wallet server may receive an update involving a token from, for example, an issuer backend. In one embodiment, the update may involve suppression state (s) (e.g., NFC suppression, pay-with-points suppression, wallet binding/unbinding, token linking/unlinking, user preference updates, etc. Other non-standard payment functions may be communicated as is necessary and/or desired.

In another embodiment, a triggering event may occur in any of the issuer wallet server, the issuer wallet application, the third party wallet server, or the third party wallet application. The issuer wallet server, however, may be the master, while the third party wallet server, or the third party wallet application are clients. The clients use this four-way communication system to communicate such events back to the issuer wallet server. The issue wallet server then takes the appropriate action(s) (e.g., update one or more user profile), and communicates back to respective clients if actions are needed In step 310, the issuer wallet server may provide the update to the issuer wallet application. In one embodiment, the issuer wallet server may push the update to the issuer wallet application. In another embodiment, the issuer wallet application may periodically pull the information from the issuer wallet server.

In step 315, the issuer wallet application may communicate the update to the third party wallet application, using, for example, application-to-application communication.

In step 320, the issuer wallet server may provide the update to the third party wallet server. In one embodiment, the issuer wallet server may use one or more API to communicate the update to the third party wallet server. Any other suitable communication channel, such as a secure communication channel, may be used as is necessary and/or desired. This synchronizes the issuer wallet server and the third party wallet server.

In step 325, the third party wallet server may update its records with the update.

In step 330, the issuer wallet server may communicate the update to the third party wallet application. In one embodiment, a third party device manager server may be used.

Although several embodiments are disclosed herein, it should be recognized that they are not exclusive, and elements of one embodiment may be used with other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for token and transaction management, comprising:
   in an issuer wallet server comprising at least one computer processor, the issuer wallet server storing a DeviceWalletID, the DeviceWalletID having a plurality of attributes:
     receiving an update for one of the attributes of the Device WalletID;
     providing the update to an issuer wallet application executed by a mobile electronic device;
     providing the update to a third party wallet server associated with a third party wallet application executed by the mobile electronic device, wherein the third party wallet server communicates the update to the third party wallet application; and
     updating the attribute in the Device WalletID stored at the issuer wallet server.

2. The method of claim 1, wherein the attribute specifies a suppression state for a feature of the issuer wallet application or the third party wallet application.

3. The method of claim 2, wherein the suppression state specifies suppression of NFC communication.

4. The method of claim 1, wherein the attribute comprises a partner attribute, a device-level wallet attribute, or a token level attribute.

5. The method of claim 4, wherein the partner attribute identifies the third party wallet application.

6. The method of claim 4, wherein the device-level wallet attribute identifies a wallet binding state.

7. The method of claim 4, wherein the device-level wallet attribute specifies a user preference for a feature of the issuer wallet application or the third party wallet application.

8. The method of claim 7, wherein the user preference comprises a show preference for the feature.

9. The method of claim 4, wherein the token level attribute comprises a token wallet characteristic that identifies a linkage between the issuer wallet application and the third party wallet application.

10. The method of claim 1, wherein the update is received from an issuer backend.

11. The method of claim 1, wherein the update is received from the issuer wallet application.

12. The method of claim 1, wherein the issuer wallet server pushes the update to the issuer wallet application.

13. The method of claim 1, wherein the issuer wallet server provides the update to the third party wallet server using an API.

14. The method of claim 1, wherein the issuer wallet application communicates the update to the third party wallet application using application-to-application communication.

15. A system for token and transaction management, comprising:
- an issuer wallet application executed by a mobile electronic device; and
- an issuer wallet server comprising at least one computer processor, wherein the issuer wallet server stores a Device WalletID for an issuer wallet, the Device WalletID comprising a plurality of attributes;

wherein:
- the issuer wallet server receives an update for one of the attributes in the Device WalletID;
- the issuer wallet server provides the update to the issuer wallet application;
- the issuer wallet server provides the update to a third party wallet server associated with a third party wallet application executed by the mobile electronic device, wherein the third party wallet server communicates the update to the third party wallet application; and
- the issuer wallet server updates the attribute in the Device WalletID stored at the issuer wallet server.

16. The system of claim 15, wherein the attribute specifies a suppression state for a feature of the issuer wallet application or the third party wallet application.

17. The system of claim 15, wherein the attribute comprises a partner attribute, a device-level wallet attribute, or a token level attribute.

18. The system of claim 17, wherein the device-level wallet attribute identifies a wallet binding state.

19. The system of claim 17, wherein the token level attribute comprises a token wallet characteristic that identifies a linkage between the issuer wallet application and the third party wallet application.

20. The system of claim 15, wherein the issuer wallet server provides the update to the third party wallet server using an API.

\* \* \* \* \*